United States Patent

Zhang

[11] Patent Number: 5,952,097
[45] Date of Patent: Sep. 14, 1999

[54] COCRTA/COCRPTTA BI-LAYER MAGNETIC THIN FILMS

[75] Inventor: Bing Zhang, Fremont, Calif.

[73] Assignee: Seagate Technology, Inc., Scotts Valley, Calif.

[21] Appl. No.: 08/964,259

[22] Filed: Nov. 4, 1997

Related U.S. Application Data

[62] Division of application No. 08/608,142, Feb. 28, 1996, Pat. No. 5,772,857
[60] Provisional application No. 60/007,432, Nov. 21, 1995.

[51] Int. Cl.$^6$ .............................................. G11B 5/66
[52] U.S. Cl. .................. 428/332; 428/336; 428/694 T; 428/694 TS; 428/694 TM; 428/900
[58] Field of Search .................... 428/694 T, 694 TS, 428/900, 332, 336

[56] References Cited

U.S. PATENT DOCUMENTS

| | | | |
|---|---|---|---|
| 4,652,479 | 3/1987 | Suzuki | 428/65.3 |
| 4,749,628 | 6/1988 | Ahlert | 428/660 |
| 4,950,548 | 8/1990 | Furusawa et al. | 428/611 |
| 4,990,362 | 2/1991 | Kibe et al. | 427/528 |
| 5,188,907 | 2/1993 | Kawahara | 428/694 R |
| 5,432,012 | 7/1995 | Lal | 428/610 |
| 5,474,830 | 12/1995 | Yamaguchi et al. | 428/141 |
| 5,558,945 | 9/1996 | Miyazaki | 428/611 |
| 5,605,733 | 2/1997 | Ishikawa et al. | 428/65.3 |
| 5,607,783 | 3/1997 | Onodera | 428/694 T |
| 5,744,256 | 4/1998 | Goda et al. | 428/694 T |
| 5,763,071 | 6/1998 | Chen | 428/332 |
| 5,772,857 | 6/1998 | Zhang | 204/192.2 |

OTHER PUBLICATIONS

CoCrPt Media on HCP Intermediate Layers, Fang et al., Data Storage Center Review Presentations, Nov. 1, 1994.
A Study of Magnetic Recording Media on Glass Substrates, Shalin Duan et al., IEEE Transactions on Magnetics, vol. 30, No. 6, Nov. 1994.
NiAl Underlayers for CoCrTA Magnetic Thin Films, Li–Lien Lee et al., IEEE Transactions on Magnetics, vol. 30, No. 6, Nov. 1994.
High Coercivity and Low Noise Media Using Glass Substrate, Xiaoxia Tang et al., IEEE Transactions on Magnetics, vol. 30, No. 6, Nov. 1994.

*Primary Examiner*—Leszek Kiliman
*Attorney, Agent, or Firm*—Kinney & Lange, P.A.

[57] ABSTRACT

Double layer, or bi-layer, magnetic films are deposited over a substrate with an underlayer. The bi-layer film is a film of two different magnetic layers which have different chemical composition, deposited with no spacer layer between the two layers. The lower magnetic layer should be of a low noise magnetic material, while the upper magnetic layer should be a high coercivity magnetic material. The bi-layer film exhibits a single response to magnetic recording and a joint coercivity different from the coercivity of either layer by itself. A preferred double layer media uses a CoCrTa layer deposited under a CoCrTaPt layer, with the CoCrTa layer comprising 30 to 70% of the total film thickness. The double layer film produces magnetic media with higher coercivity and lower media noise as compared to single layered films of either of the materials of the magnetic layers.

18 Claims, 4 Drawing Sheets

COCRTA/COCRPTTA BI-LAYER MAGNETIC THIN FILMS

This application is a divisional of application Ser No. 08/608,142, filed Feb. 28, 1996 now U.S. Pat. No. 5,772,857, which the prior application is claimed pursuant to 35 USC § 120.

BACKGROUND OF THE INVENTION

The present invention relates generally to magnetic thin films for recording information, and, more particularly, to the use of a two layer magnetic thin film to increase coercivity and/or decrease noise as compared to either layer by itself.

Magnetic media are widely used in the computer industry. The media can be locally magnetized by a write transducer, or write head, to record and store information. The write transducer creates a highly concentrated magnetic field which alternates direction based on bits of the information being stored. When the local magnetic field produced by the write transducer is greater than the coercivity of the recording medium, then grains of the recording medium at that location are magnetized. The grains retain their magnetization after the magnetic field produced by the write transducer is removed. The direction of the magnetization matches the direction of the applied magnetic field. The magnetization of the recording medium can subsequently produce an electrical response in a read transducer, allowing the stored information to be read.

The computer industry continually seeks to reduce size of computer components and to increase the speed at which computer components operate. To this end, it is desired to reduce the size required to magnetically record bits of information. It is concomitantly important to maintain the integrity of the information as size is decreased, and disc drives which magnetically store information must be virtually 100% error free. The space necessary to record information in magnetic media is dependent upon the size of transitions between oppositely magnetized areas. It is generally desired to produce magnetic media which will support as small of transition size as possible. However, the output from the small transition size must avoid excessive noise to reliably maintain integrity of the stored information.

In a recording medium with a square hysteresis loop, the width of a recorded transition, a, is predicted to be $$a = (M_r t d / \pi H_c)^{0.5}$$

wherein

M_r is remanent magnetization;

t is medium thickness;

d is the distance from the write transducer to the medium; and $H_c$ is medium coercivity.

The transition widens with $M_r$ as a result of the fact that the magnetic field existing on one side of a transition affects magnetization on the other side of the transition. The transition narrows as $H_c$ is increased, because with high coercivity, the medium can resist the transition broadening due to the neighboring fields. The magnetic field produced by the write transducer, or head field gradient, is sharpest near the pole tips of the head. The transition widens with d and t, due to the fact that a poorer head field gradient is obtained within the medium when the particles are a further distance from the head. Smaller head-to-medium spacing and thinner medium both lead to narrower transitions being recorded.

Several material parameters influence the ability of a material to magnetize. Shape anisotropy effects the ease of magnetic recording, as particles are more easily magnetized along the long dimension of the particles. Magnetoelastic anisotropy of a material may effect the ease of magnetic recording. Crystalline anisotropy effects the ease of magnetic recording based on the orientation of crystal structures in the material. In thin films, crystalline anisotropy is the primary means of magnetization. In a disc, grains are more easily magnetized along the plane of the disc because the grains have a preferred crystalline orientation for magnetization lying along the plane. The magnetization results given herein are along the plane of the disc.

Magnetic thin films are a particular type of magnetic media which are commonly used in computer applications. Thin film media typically consist of a layer or film of a magnetic substance deposited over a substrate. The magnetic substance may be a cobalt based alloy, and the substrate may be a nickel-phosphored aluminum or may be silicon or glass based. A relatively nonmagnetic underlayer such as chromium may be used between the magnetic film and the substrate.

Thin-film recording media generally have good magnetic properties for small transitions and high-density recording. Because they are nearly 100% dense (voids at the grain boundaries reduce the density somewhat), they can be made to have a high magnetization. Because of their high magnetization, they can be made quite thin and still provide adequate signal during readback. The small thickness of thin-film media helps to narrow the recorded transition. Thin-film media can also be made quite smooth, helping to reduce head to medium spacing.

It has been theorized that noise in thin-film media increases when polycrystalline films are strongly exchange coupled. Exchange coupling occurs due to the magnetic effect of adjacent grains. Strongly exchange coupled films tend to exhibit irregular zigzag transitions, which produce considerable jitter in the transition position relative to the location where the record current in the head goes through zero. Various suggestions have been made toward reducing jitter noise in thin-film media. For instance, it has been proposed that the introduction of nonmagnetic elements which segregate to the grain boundaries during deposition, together with careful control of the sputtering conditions, may achieve a porous microstructure at the grain boundaries and reduce exchange coupling and transition jitter. A thin-film with low noise and low exchange energy characteristics is a primary requirement for overall achievement of magnetic recording performance.

When applied as a thin film, different types of magnetic alloy produce different coercivities and noise values. The coercivities and media noise can also be affected significantly by optimizing the deposition processes and controlling the microstructure of films. For instance, Co-Cr-Ta and Co-Cr-Pt films can be applied to exhibit coercivity values such as in the range of 1800–2600 Oersteds, while Co-Cr-Pt-Ta films applied by the same methods exhibit higher coercivity values such as in the range of 2000–2900 Oersteds. However, the noise produced by the Co-Cr-Pt-Ta films may be twice that the Co-Cr-Ta films. To decrease transition size, it is desired to produce magnetic media which have higher coercivities, while still providing low noise.

SUMMARY OF THE INVENTION

Bi-layer, or double layer, magnetic films are deposited over a substrate with an underlayer to produce magnetic media with high coercivity and low media noise. The bi-layer film is a film of two different magnetic layers which have different chemical composition, deposited with no spacer layer between the two layers. The bi-layer film exhibits a single response to magnetic recording and a joint coercivity different from the coercivity of either layer by itself. A preferred bi-layer media uses a CoCrTa layer deposited under a CoCrTaPt layer, with the CoCrTa layer comprising 30 to 70% of the total film thickness. With this bi-layer magnetic film, the coercivity may be as much as 500 Oe higher than that of either alloy in their single-layer-film form, while the media noise can be as low as that of CoCrTa single-layer film.

DETAILED DESCRIPTION OF THE PREFERRED EMBODIMENTS

Figure 1:
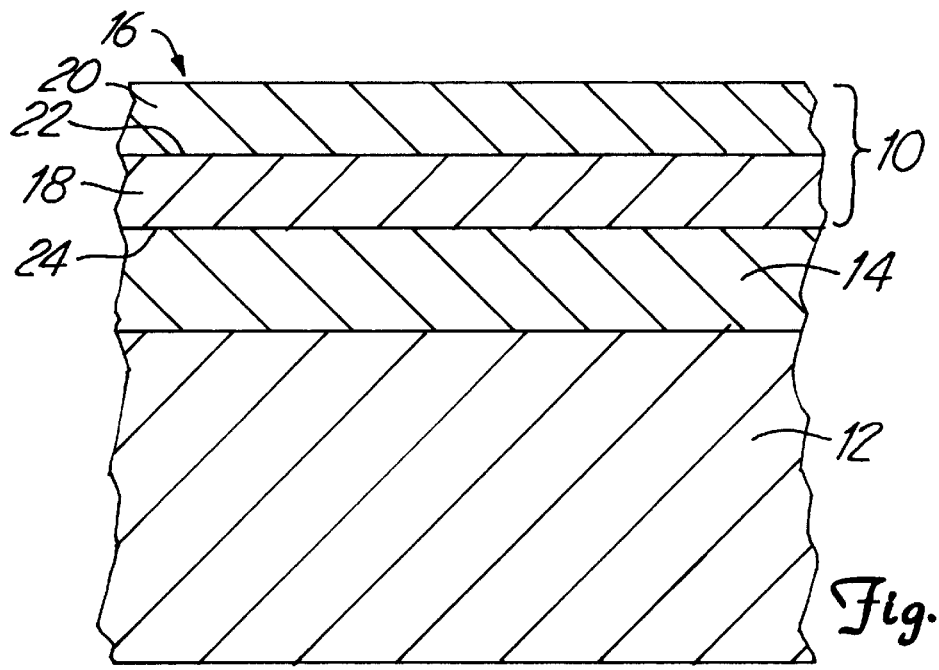
FIG. 1 is a cross-sectional side view of a recording medium incorporating the bi-layer film of the present invention.

The present invention involves using a double or bi-layer film 10 for high coercivity and low noise media. Bi-layer magnetic film 10 is deposited over a substrate 12 with an underlayer 14 to produce magnetic media 16 with high coercivity and low media noise. The double or bi-layer film 10 is a film of two different magnetic layers 18, 20 which each have a different chemical composition, deposited with no spacer layer between the two layers.

In the preferred embodiments, a magnetic alloy 20 with higher coercivity and noise in single layer form is deposited directly over a magnetic alloy 18 with lower coercivity and noise in single layer form. The preferred lower layer 18 is a CoCrTa alloy, and the preferred upper layer 20 is a CoCrTaPt alloy. In the CoCrTa alloy, the proportion of Co as an atomic molar ratio should be 70% or greater, and preferably 75 to 86%. The proportion of Cr in the CoCrTa alloy should be between 0 and 25%, and preferably 8 to 16%. The proportion of Ta in the CoCrTa alloy should be 0 to 10%. In the CoCrPtTa alloy, the proportion of Co should be 50% or greater, and preferably 75 to 86%. The proportion of Cr in the CoCrPtTa alloy should be between 5 and 25%, and preferably 8 to 16%. The proportion of Pt in the CoCrPtTa alloy should be between 0 and 50%, and preferably 2 to 25%. The proportion of Ta in the CoCrPtTa alloy should be 0 to 10%. Coercivity and media noise both vary according to the thickness ratio of the upper layer 20 to the lower layer 18. The amounts of the $H_c$ enhancement and media noise reduction also depend on the deposition processes and the alloy selections for the bi-layer film 10. At some specific thickness ratios, the bi-layer film 10 can not only have $H_c$ hundreds of Oersteds higher than do single-layer films of either of the two magnetic materials, but also exhibit much lower media noise than do CoCrTaPt single-layer films.

Figure 2:
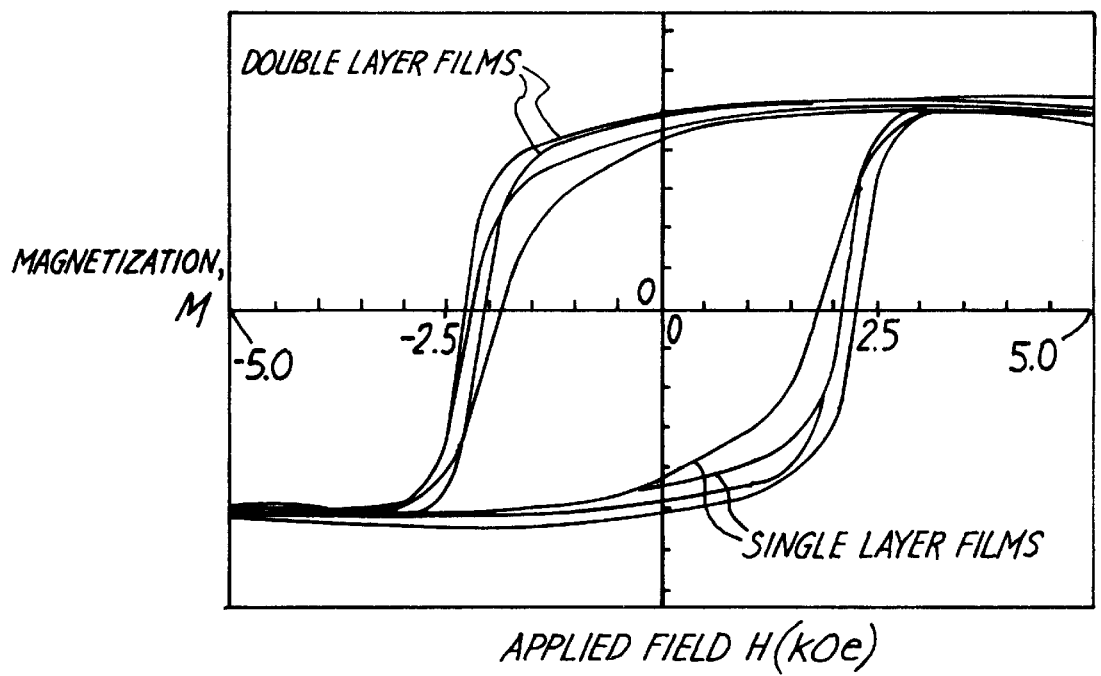
FIG. 2 graphically shows in-plane hysteresis loops for double and single layer films.

FIG. 2 shows a set of hysteresis curves including double layer and single layer films. In spite of the fact that there is a low $H_c$ alloy on the bottom of the double-layer film and high $H_c$ alloy on the top, the double-layer films exhibit single hysteresis loops in Vibrating Sample Magnetometry (VSM) measurement. The single hysteresis loop indicates that both magnetic layers switch together under the applied magnetic field. Switching field distribution, represented by the slope of the hysteresis loop at M=0 when the direction of magnetization switches, does not become wider for the double layer composite film. The narrow switching field distribution indicates that the upper magnetic layer 20 and the lower magnetic layer 18 are vertically exchange coupled across the interface 22 between the layers.

The noise reduction is believed to be primarily due to the initial growth mode of the magnetic film and the seeding microstructure. During deposition, the initial crystal lattice of the magnetic films may have a tendency to match with the crystal lattice of the underlying layer. The lower magnetic layer 18 of the double-layer film 10 forms certain crystal textures that are incipient in or form the basis of a low noise microstructure. If the upper layer 20 is thin, it somewhat "inherits" the bottom layer microstructure and crystal texture, and thus retains the low noise characteristics of the underlying magnetic layer 18. Thus the initial film growth of the low noise alloy 18 seeds a low noise microstructure to the high coercivity upper layer 20. As the upper layer 20 becomes thicker, the growth mode of the crystals probably changes, resulting in higher media noise.

Grazing angle x-ray diffraction provided strain and stress information of the double or bi-layer films as compared to single layer films of CoCrTa and CoCrTaPt. In single layer form, the CoCrTa film has lattice parameters measured as a=2.54 and c=4.18. In single layer form, the CoCrTaPt film has larger lattice parameters measured as a=2.56 and c=4.26. Similar to having a single magnetic hysteresis loop, the double layer films a single set of lattice parameters. The double layer lattice parameters lie between the measured lattice parameters of the single layers, apparently because the bottom layer and the top layer of the double layer film couple together crystallographically through stress strain interations across interface 22. The stretch in the c axis of the CoCrTa layer appears to increse the effective crystal anisotropy, therefore increasing $H_c$ of the bottom layer.

Other mechanisms may also play a role in producing the high coercivity and low noise of the double layer film 10. The beneficial coercivity delta from the double layer film 10 (i.e., the difference in coercivity from single layer films of either material) could stem from the tensile or compressive stress transmitted across the interface 22. Because of the crystalline mismatch at the Cr and CoCrTa interface 24, the CoCrTa bottom layer 18 would be under stress. Without an upper layer, this stress would have been relaxed at a top free surface. When CoCrTaPt is deposited as the upper layer 20, the CoCrTa layer 18 is restricted both at interface 24 and at interface 22 and stress in the crystal lattice of the CoCrTa layer 18 is retained. The crystalline lattice parameters, a and c. of the CoCrTaPt upper layer 20 are larger than those of the CoCrTa lower layer 18, and the upper CoCrTaPt layer 20 experiences a compressive stress at the interface 22. Preliminary x-ray diffraction data indicate that the lattice parameters of the double layer film 10 were larger than that of a CoCrTa single layer film and smaller than that of a CoCrTaPt single layer film. The nucleation barrier of each alloy may also influence the growth mode of the crystal structures in the double layer film 10.

A "superposition effect", based on the combined average intrinsic properties of layer 18 and layer 20 of the double layer film 10, would tend to limit the beneficial effects of the seeding microstructures. The alloy of the upper layer 20 has different crystal anisotropy and different exchange energy as compared to the alloy of the lower layer 18, due to different chemical compositions. The overall magnetic properties of the double layer film 10 are somewhat based on a superposition of the magnetic properties of lower layer 18 and upper layer 20, and vary as the volume ratio between the two different layers 18, 20 changes. As the second layer 20 gets thicker, the average exchange coupling among grains becomes stronger. This superposition effect could account for the noise increase with the relative thickness of the upper layer 20.

Magnetostriction may also play an important role for the peak $H_c$ of double layer films at optimal thickness ratios. The magnetostriction phenomenon in double layer films is not well understood, and study is ongoing.

EXAMPLES

The following examples represent testing of discs with double layer magnetic films 10. All of the discs within the comparison groups had an identical substrate 12 and Cr underlayer 14. An Intevac MDP250 sputter system was used to deposit the magnetic layers 18, 20. The bottom magnetic layer 18 and the upper magnetic layer 20 were deposited immediately one after the other in two adjacent sputter chambers. The thickness of the lower layer 18 and the upper layer 20 was controlled by varying sputter power within the sputter chambers, while keeping the sputter duration constant for all discs.

The magnetic properties of the resultant discs were tested on a remanent moment magnetometer (RMM). The discs were tested for recording performance on a Guzik 1601 tester. Media noise was integrated through the frequency range of 1.17 to 36.2 MHz and normalized against the square of track amplitude average, $(TAA)^2$.

Example I $Co_{84}Cr_{10}Ta_6/Co_{76}Cr_{12}Pt_{10}Ta_2$ Double Layer Films

The first example involves three series of discs. For each of the discs in these three series, a lower layer 18 of $Co_{84}Cr_{10}Ta_6$, (i.e, an allow having an atomic molar ratio of 84% Cobalt, 10% Chromium and 6% Tantalum) was deposited on the Cr underlayer 14, and an upper layer 20 of $Co_{76}Cr_{12}Pt_{10}Ta_2$ was deposited over the lower layer 18. The first series of discs used a substrate 12 which had been polished. The second series of discs used a substrate 12 which had been mechanically textured. Both the first and the second series of discs were tested with the same inductive head. The third series of discs were formed under slightly different process conditions, so testing could be performed with an MR head.

Figure 3:
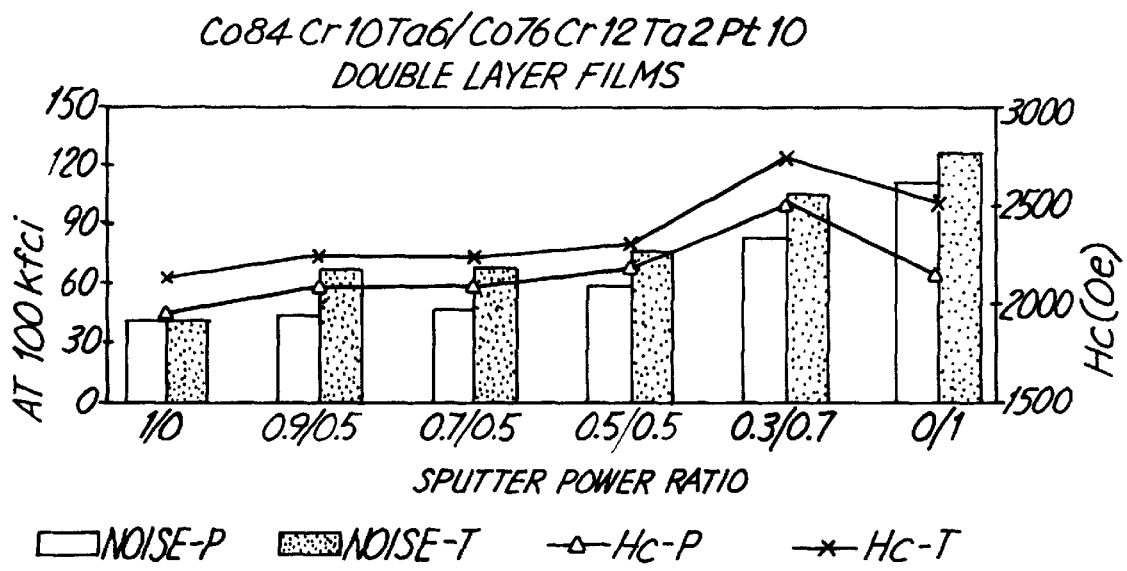
FIG. 3 graphically shows coercivity and noise values for a first composition of double layer films according to the present invention at different layer thickness ratios.

The thickness of the bi-layer film 10 in the first two series of discs was kept constant around 420 Å, producing an $M_r t$ of the films of around 2.0 memu/cm². The inductive head tested medium noise at a flux change per linear inch of 100 kfci. at a rotation speed 4000 rpm and at 1.27 inch radius. The testing results of the first two series of discs are graphically displayed in FIG. 3.

The testing results showed that both coercivity, $H_c$, and media noise, $Ns/TAA^2$, vary according to the sputter power ratio, or film thickness ratio. The thin films 10 on the textured substrate discs, in general, exhibit higher $H_c$ and higher media noise compared with the thin films on polished substrate discs.

The single layer CoCrTa film produced by the 1/0 sputter power ratio had the lowest noise. As the thickness of the CoCrTaPt layer 20 was increased, the media noise increased. The media noise reached a maximum for the single layer CoCrTaPt film produced by the 0/1 sputter power ratio.

In contrast to the monotonically increasing media noise results, coercivity for both of the tested disc series arrives at the maximum at a specific thickness ratio of the double layer films. At a sputter power ratio of 0.3/0.7, for which the CoCrTaPt layer 20 would be about twice as thick as the CoCrTa layer 18, the thin film 10 produced a coercivity which was markedly higher than either the coercivity of the single layer form of the CoCrTaPt alloy or the coercivity of the single layer form of the CoCrTa alloy. The marked increase in coercivity over both single layer thin films, produced with only a slight increase in noise as compared to the CoCrTa single layer thin film, allows for smaller transitions and higher density recording without jeopardizing the integrity of the information recorded.

A third series of discs were produced using a $Co_{84}Cr_{10}Ta_6/Co_{76}Cr_{12}Pt_{10}Ta_2$, double layer thin film. In this third disc series, slightly different deposition process conditions were used and total thickness of bi-layer film 10 controlled so that $M_r t$ of all the films 10 was approximately 1.0 memu/cm². With this lower $M_r t$, an MR head could be used in recording performance testing. The MR head had a gap length 0.32 μm, and recording performance was tested at a flux change per linear inch of 130 kfci, at a rotation speed 3500 rpm at 1.275 inch radius on the discs.

Figure 4:
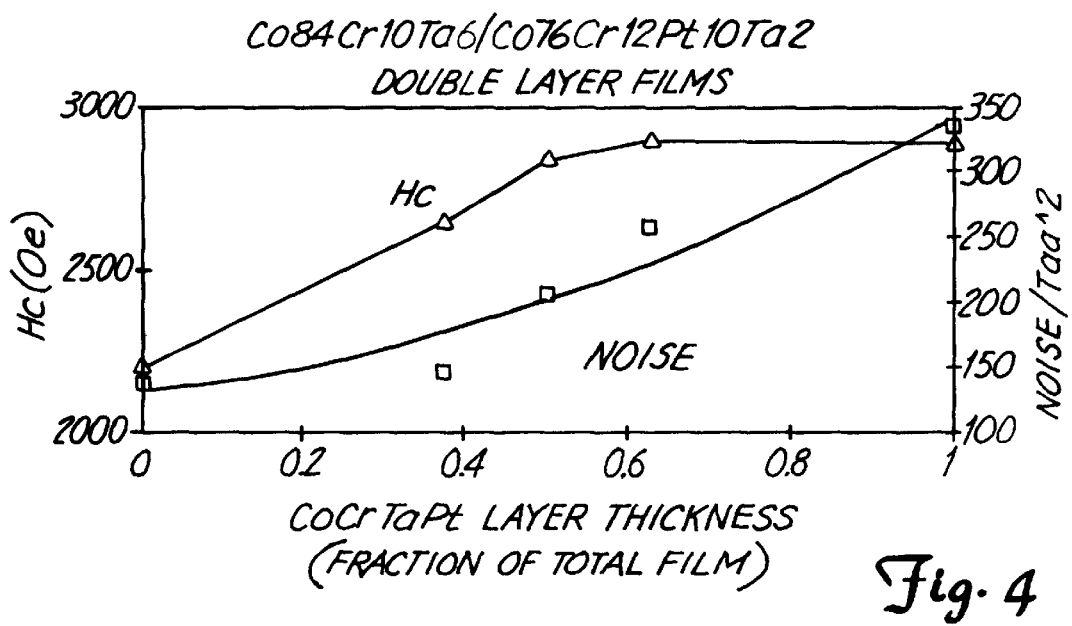
FIG. 4 graphically shows coercivity and noise values for the first composition of double layer films according to the present invention at different layer thickness ratios, deposited by a different technique.

The testing results of the third series of discs are graphically displayed in FIG. 4. The coercivity for the double layer thin film 10 with 50–60% of the thickness provided by the upper layer equaled the coercivity of the single CoCrTaPt layer. The media noise of the double layer film 10 was much lower compared with the single layer form of the CoCrTaPt alloy. The coercivity of the double layer thin film 10 was considerably higher than that of the single layer CoCrTa thin film, with only a slight increase in media noise. Similar to the first two series of discs, the high coercivity/low noise combination produced by the double layer film 10 as read by the MR head allows for smaller transitions and higher density recording without jeopardizing the integrity of the information recorded.

Example II $Co_{80}Cr_{16}Ta_4/Co_{76}Cr_{12}Pt_{10}Ta_2$ Double Layer Films

The second example involved a lower layer 18 of $Co_{80}Cr_{16}Ta_4$ with the same composition of $Co_{76}Cr_{12}Pt_{10}Ta_2$ for upper layer 20. All substrates 12 for the second example were polished, and the total thickness of bi-layer film 10 was controlled in such a way that $M_r t$ was about 1.0 memu/cm² for all films 10. The MR head for testing had a gap length 0.32 μm, and recording performance was tested at a flux change per linear inch of 130 kfci, at a rotation speed 3500 rpm at 1.275 inch radius on the discs.

Figure 5:
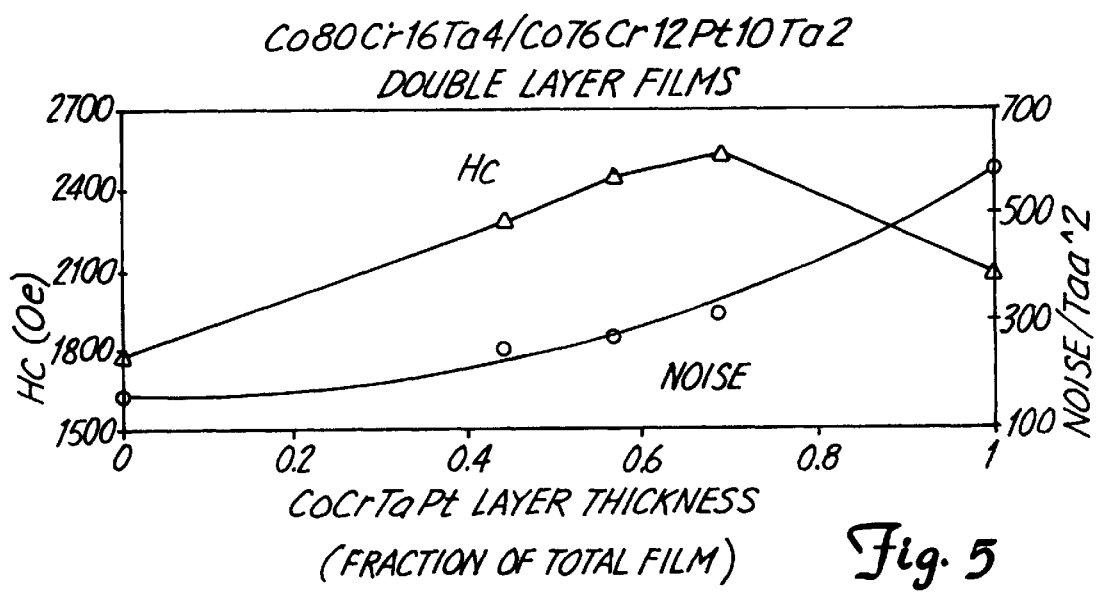
FIG. 5 graphically shows coercivity and noise values for a second composition of double layer films according to the present invention at different layer thickness ratios.

The testing results for different thickness ratios of the second example are graphically displayed in FIG. 5. The single layer films exhibit coercivity values of about 1800 Oe for a single layer CoCrTa alloy and about 2000 Oe for a single layer CoCrTaPt alloy. Under the same sputter and deposition process conditions and with upper CoCrTaPt layer 20 at 68% of the total film thickness, the double layer film 10 exhibited a coercivity of about 2500 Oe. The media noise was the lowest for the single layer CoCrTa film at about 200, and increases to about 350 when the highest coercivity $H_c$ is achieved. The single layer CoCrTaPt film had a media noise level which is considerably higher, at about 600. Similar to Example I, the high coercivity/low noise combination produced by this double layer film 10 again allows for smaller transitions and higher density recording without jeopardizing the integrity of the information recorded.

Example III $Co_{80}Cr_{14}Ta_6/Co_{76}Cr_{12}Pt_{10}Ta_2$ Double Layer Films The third example involved a lower layer 18 of $Co_{80}Cr_{14}Ta_6$ with the same upper layer 20 of $Co_{76}Cr_{12}Pt_{10}Ta_2$. Similar to Example II, substrates 12 were polished and the total thickness of bi-layer film 10 was controlled in such a way that $M_r t$ was about 1.0 memu/cm² for all films 10. The MR head for testing had a gap length 0.32 μm, and recording performance was tested at a flux change per linear inch of 130 kfci, at a rotation speed 3500 rpm at 1.275 inch radius on the discs.

Figure 6:
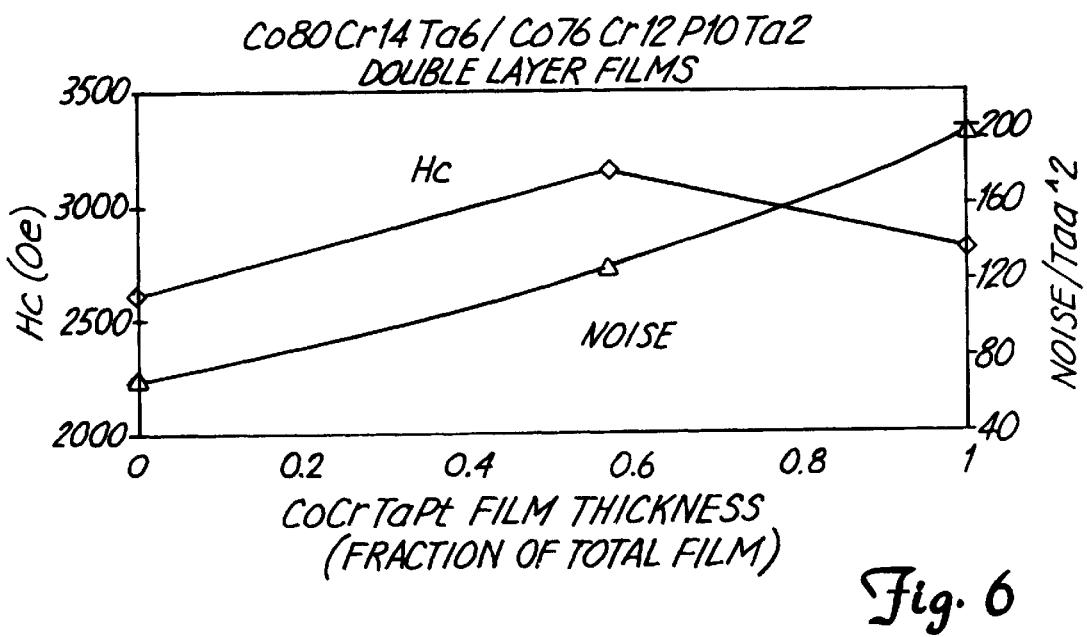
FIG. 6 graphically shows coercivity and noise values for a third composition of double layer films according to the present invention at different layer thickness ratios.

The testing results for different thickness ratios of Example III are graphically displayed in FIG. 6. The coercivity of the double-layer film reached 3160 Oe at the 55% CoCrTaPt thickness while, in the single layer form, the coercivity of the alloys is 2600 Oe and 2800 Oe, respectively. The media noise is about 130 for the double layer film 10, compared with a media noise of about 80 for the single layer CoCrTa film and about 180 for the single layer film of CoCrTaPt. Similar to Examples I and II, the high coercivity/low noise combination produced by this double layer film 10 again allows for smaller transitions and higher density recording without jeopardizing the integrity of the information recorded.

Example IV $Co_{76}Cr_{12}Pt_{10}Ta_2/Co_{84}Cr_{10}Ta_6$ Double Layer Films The fourth example used the identical chemical composition as Example I, but reversed the order of the two layers. A layer of high $H_c$, high-noise $Co_{76}Cr_{12}Pt_{10}Ta_2$ was deposited first, and a layer of lower $H_c$, low-noise $Co_{84}Cr_{10}Ta_6$ was deposited on top. The remaining parameters—deposition process conditions, $M_r t$, head type, gap length, flux change per linear inch, rotation speed and test radius—were maintained equal to those of the third series of discs from Example I.

Figure 7:
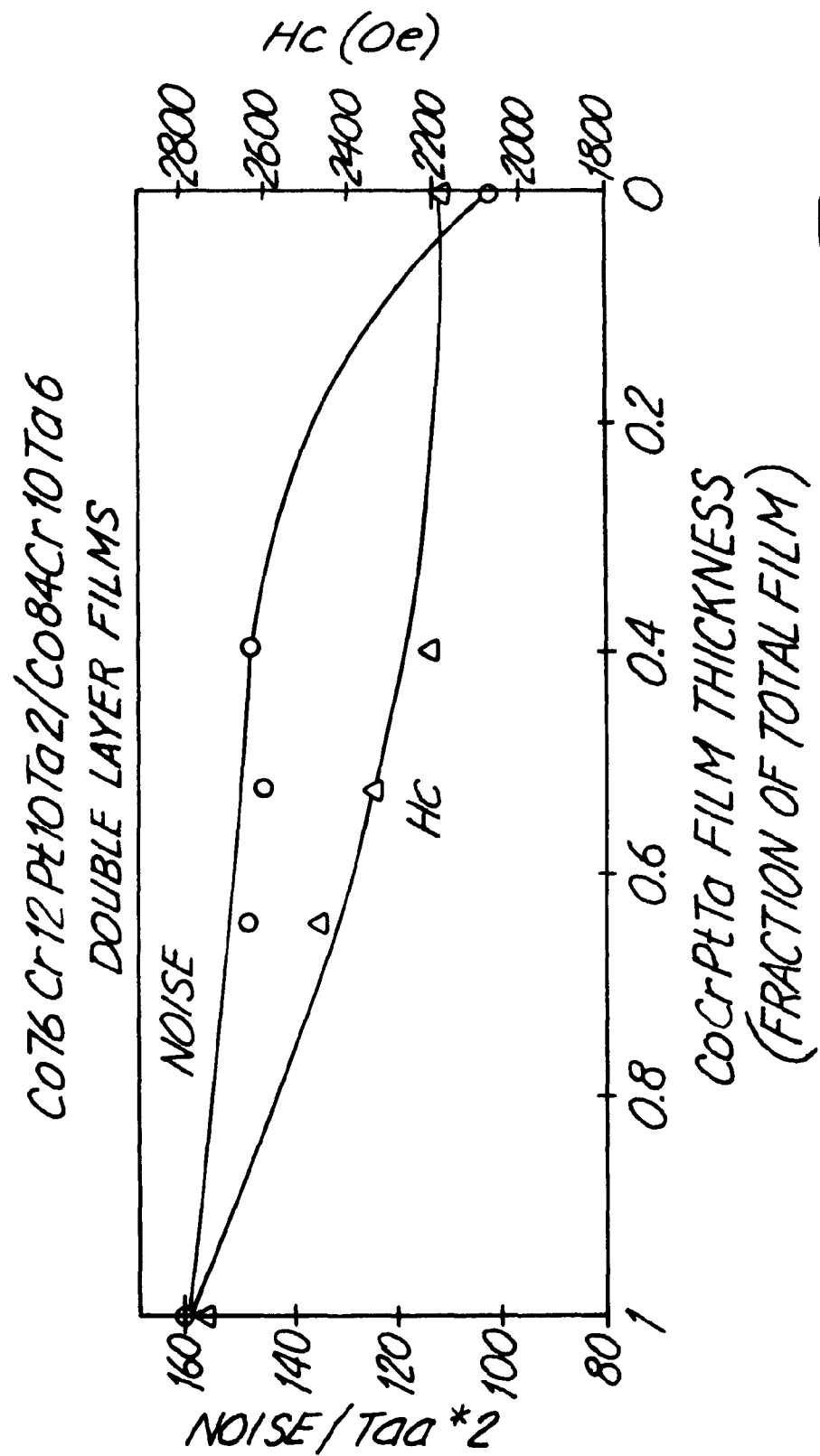
FIG. 7 graphically shows coercivity and noise values for the first composition of double layer films deposited in reverse order at different layer thickness ratios.

The testing results for different thickness ratios of the reversed layers of Example IV are graphically displayed in FIG. 7. By reversing the order of the layers, i.e., deposit high $H_c$, high-noise film first, and then deposit the lower $H_c$, low-noise layer second, the test results are also reversed. The media noise stays almost as high as that of the single-layer CoCrTaPt for all double-layer films. Media noise does not change with the relative thickness of the two individual layers in the range studied. The $H_c$ decreases monotonically as the relative thickness of CoCrTa layer increases. The low coercivity/higher noise combination produced by this double layer film indicates that the order of deposition of the two layers 18, 20 is critical to the performance of the double layer thin film 10.

Although the present invention has been described with reference to preferred embodiments, workers skilled in the art will recognize that changes may be made in form and detail without departing from the spirit and scope of the invention.

What is claimed is:

1. A thin film media for magnetic recording of information, the thin film media comprising:
   a substrate;
   a non-magnetic underlayer film deposited over the substrate;
   a film of a first magnetic material having a first film thickness deposited over the underlayer film, the film of the first magnetic material having a first media noise; and
   a film of a second magnetic material deposited directly over the film of the first magnetic material, the film of the second magnetic material having a second film thickness of from 30 to 200% of the first film thickness, the film of the second magnetic material having a second media noise which is greater than the first media noise;
   wherein the film of the first magnetic material and the film of the second magnetic material exhibit a joint response to magnetic recording, a joint coercivity, and a joint media noise which is less than the second media noise.

2. The thin film media of claim 1 wherein the first magnetic material is a cobalt-chromium-tantalum alloy.

3. The thin film media of claim 2 wherein the cobalt-chromium-tantalum alloy has a molar ratio of at least 70% cobalt, up to 25% chromium, and up to 10% tantalum.

4. The thin film media of claim 3 wherein the cobalt-chromiuri-tantalum alloy has molar ratios of 80% cobalt, 16% chromium and 4% tantalum.

5. The thin film media of claim 3 wherein the cobalt-chromium-tantalum alloy has molar ratios of 84% cobalt, 10% chromium and 6% tantalum.

6. The thin film media of claim 1 wherein the second magnetic material is a cobalt-chromium-tantalum-platinum alloy.

7. The thin film media of claim 6 wherein the cobalt-chromium-tantalum-platinum alloy has a molar ratio of at least 50% cobalt, 5 to 25% chromium, up to 10% tantalum, and up to 50% platinum.

8. The thin film media of claim 7 wherein the cobalt-chromium-tantalum-platinum alloy has molar ratios of 76% cobalt, 12% chromium and 2% tantalum and 10% platinum.

9. The thin film media of claim 1 wherein the non-magnetic underlayer film is chromium.

10. The thin film media of claim 1 wherein the film of the first magnetic material in single layer form has a first coercivity, the film of the second magnetic material in single layer form has a second coercivity, and the first coercivity differs from the second coercivity by about 200 Oersteds or more.

11. The thin film media of claim 1 wherein the film of the first magnetic material in single layer form has a first coercivity, the film of the second magnetic material in single layer form has a second coercivity, and the first coercivity is less than the second coercivity.

12. The thin film media of claim 1 wherein the film of the first magnetic material in single layer form has a first coercivity, and the joint coercivity is greater than the first coercivity.

13. The thin film media of claim 1 wherein the film of the second magnetic material in single layer form has a second coercivity, and wherein the joint coercivity is greater than the second coercivity.

14. The thin film media of claim 1, wherein the film of the first magnetic material has a first generally uniform composition and wherein the film of the second magnetic material has a second generally uniform composition.

15. A thin film media for magnetic recording of information, the thin film media comprising:
   a substrate;
   an underlayer deposited over the substrate; and
   a bi-layer thin film deposited over the underlayer, wherein the bi-layer thin film comprises:
      a film of cobalt-chromium-tantalum alloy; and
      a film of cobalt-chromium-tantalum-platinum alloy deposited directly over the film of cobalt-chromium-tantalum alloy.
   wherein the film of cobalt-chromium-tantalum alloy has a thickness which makes up 30 to 70% of a thickness of the bi-layer film.

16. The thin film media of claim 15 wherein a thickness of the bi-layer thin film is less than 1000 Angstroms.

17. The thin film media of claim 15, wherein the film of the first magnetic material has a first generally uniform composition and wherein the film of the second magnetic material has a second generally uniform composition.

18. A thin film media for magnetic recording of information, the thin film media comprising:
   a substrate;
   an underlayer film of chromium over the substrate;
   a first film over the underlayer film, the first film being of a generally uniform cobalt-chromium-tantalum alloy and having a first coercivity and a first media noise in single layer form; and
   a second film directly over the first film, the second film being of a generally uniform cobalt-chromium-tantalum-platinum alloy and having a second coercivity and a second media noise in single layer form, the second media noise being greater than the first media noise, the second film having a thickness of from 30 to 200% of a thickness of the first film;
   wherein the first film and the second film exhibit a joint response to magnetic recording, a joint coercivity different from the first coercivity and the second coercivity, and a joint media noise which is less than the second media noise.

* * * * *